United States Patent [19]

Tien et al.

[11] Patent Number: 5,594,065
[45] Date of Patent: Jan. 14, 1997

[54] TWO COMPONENT WATERBORNE CROSSLINKABLE POLYURETHANE/ACRYLATE-HYBRID SYSTEMS

[75] Inventors: Chao-Fong Tien, Macungie; Charles R. Hegedus, Coopersburg; Thomas M. Santosusso, Macungie; Jeanine M. Snyder, Schnecksville; Lisa A. Mercando, Pennsburg, all of Pa.

[73] Assignee: Air Products and Chemicals, Inc., Allentown, Pa.

[21] Appl. No.: 436,534

[22] Filed: May 9, 1995

[51] Int. Cl.⁶ .................... C08L 75/04; C08F 8/32
[52] U.S. Cl. .................... 524/507; 524/457; 524/555; 524/591; 525/123; 525/127; 525/128; 525/131; 525/455; 528/75
[58] Field of Search .................... 524/457, 507, 524/555, 591; 525/123, 127, 128, 131, 455; 528/75

[56] References Cited

U.S. PATENT DOCUMENTS

| | | | |
|---|---|---|---|
| 4,317,895 | 3/1982 | Guagliardo et al. | 525/455 |
| 4,318,833 | 3/1982 | Guagliardo et al. | 524/457 |
| 5,075,370 | 12/1991 | Kublitz et al. | |
| 5,137,961 | 8/1992 | Goos et al. | 524/457 |
| 5,173,526 | 12/1992 | Vijayendran et al. | |
| 5,331,039 | 7/1994 | Blum et al. | |

FOREIGN PATENT DOCUMENTS

| | | | |
|---|---|---|---|
| 41135/89 | 8/1990 | Australia. | |
| 2092157 | 9/1993 | Canada. | |
| 0350040 | 1/1990 | European Pat. Off. | 524/457 |
| 0562282 | 9/1993 | European Pat. Off. | |

*Primary Examiner*—Peter A. Szekely
*Attorney, Agent, or Firm*—Russell L. Brewer

[57] ABSTRACT

An improved two component coating system based upon crosslinkable hydroxy containing polymers and a polyisocyanate crosslinker. The improvement resides in the utilization of a water-borne hydroxy-terminated polyurethane prepolymer/acrylate hybrid, preferably a hydroxy acrylate hybrid, in combination with a water-dispersible polyisocyanate. The two component coating composition can be prepared by:

a) forming a carboxy-containing, water-dispersible, isocyanate-terminated polyurethane prepolymer, b) adding at least one acrylic monomer which contains a hydroxy-group to the carboxy-containing, water-dispersible, isocyanate-terminated polyurethane prepolymer to form a prepolymer/monomer mixture, c) adding an alkanolamine to the prepolymer/monomer mixture to introduce hydroxy functionality into the polyurethane prepolymer, d) dispersing the prepolymer/monomer mixture in water, e) adding an oil-soluble free radical initiator and a hydroxy-containing chain extender to the aqueous dispersion, f) polymerizing the acrylic monomers and completing the chain extension of the prepolymer by heating the aqueous dispersion, and g) mixing the resulting hybrid dispersion with a water-dispersible polyisocyanate.

11 Claims, No Drawings

TWO COMPONENT WATERBORNE CROSSLINKABLE POLYURETHANE/ACRYLATE-HYBRID SYSTEMS

FIELD OF INVENTION

The present invention relates to aqueous based coatings comprising two component crosslinkable polyurethane/acrylate polymer hybrids crosslinked with polyisocyanate.

BACKGROUND OF THE INVENTION

In recent years, ecological factors and government regulations have played major roles in coatings technology development. One of the main environmental concerns is how to reduce or, even better, totally eliminate the volatile organic compounds (VOC) currently used in coating compositions. Waterborne and powder coatings have received increased attention in recent coatings technology development due to such concerns. Water dispersible urethane, acrylic, alkyds, and epoxy resins are examples of such coatings. However, most of these coating systems are less resistant to chemical and solvent attack, they are lower in gloss and, in many cases, they are substantially more expensive than solvent based systems.

Polyurethanes are particularly important in the coatings industry by virtue of their outstanding properties. One and two-component waterborne urethane systems have been developed for various coatings applications, To reduce the cost, thermoplastic urethane-acrylic hybrid dispersions have received considerable attention. The hybrids possess advantages in terms of performance and cost balance when compared to either the pure urethane dispersion and pure acrylic dispersion. However, the chemical and solvent resistance of the resulting coatings based on urethane-acrylic hybrid dispersions suffer in comparison to other systems.

Representative patent literature which show water dispersible polyurethanes and hybrid systems are as follows:

U.S. Pat. No. 5,173,526 discloses a process for producing an aqueous polyurethane-vinyl polymer (hybrid) coating composition by (a) forming a carboxy-containing, water-dispersible, isocyanate-terminated polyurethane prepolymer, (b) adding a vinyl monomer mixture to the carboxy-containing, water-dispersible, isocyanate-terminated polyurethane prepolymer to make a prepolymer/monomer mixture, (c) adding tertiary amine to the prepolymer/monomer mixture, (d) dispersing the prepolymer/monomer mixture in water, (e) adding an oil-soluble free radical initiator and a chain extender to the aqueous dispersion and (f) completing the chain extension and polymerizing the vinyl monomers by heating the aqueous dispersion. A variety of vinyl monomers, which include lower alkyl ($C_{1-6}$) esters of acrylic or methacrylic acid, are suggested as being suited for the hybrid.

U.S. Pat. No. 5,331,039 discloses a coating composition comprising a water dispersible binder composition containing two different water-dispersible polyol polymers and a polyisocyanate component dispersed therein. One of the water dispersible polymers is a polyester or polyester resin containing urethane, carboxyl and/or hydroxyl groups, and the other is a hydroxylated polyacrylate or a hydroxyacrylate-grafted polyester that can be crosslinked by a hydrophilic polyisocyanate emulsified in water.

U.S. Pat. No. 5,075,370 discloses a two-component, aqueous coating composition comprising a polymer polyol component containing carboxylic or sulfonic acid groups and a polyisocyanate component. An example of the polymer polyol is a hydroxyacrylate polymer. The polyisocyanate is emulsified therein for the purpose of effecting crosslinking.

(AU-A-41135/89, discloses two-component coating compositions comprising an aqueous dispersion having at least one hydroxyl containing polymer and a polyisocyanate component. Hydroxyl containing polymers are formed by polymerizing unsaturated monomers containing hydroxy groups, often with monomers having acid groups. The resulting acid groups in the polymer then are neutralized with an amine. A variety of hydroxyacrylates and acrylic esters are suggested as candidates. Aliphatic and aromatic isocyanates, as well as uretdiones and isocyanurates, were suggested as suitable isocyanates for effecting crosslinking. Prior to application the isocyanate aqueous hydroxy polymers are emulsified in the dispersion.

Canadian Application 2,092,157 discloses a water thinnable two component coating composition comprising a polyisocyanate, a polyurethane prepolymer having free NCO groups reacted with low molecular weight or monofunctional alcohols or compounds having reactive hydrogen atoms. Water dispersible polyurethanes incorporating neutralized carboxyl functionality are utilized.

European Patent Application (EP 0562 282 A1 discloses a two component waterbased varnish based upon a blend of (A) an aqueous dispersion of an acrylic polymer containing from 2–4% hydroxy groups and an aliphatic polyurethane resin and (B) a liquid aliphatic polyisocyanate having low volatility, generally incorporating a solvent. The acrylate/polyurethane ratio is 60/40 and the acrylate content is from 15 to 18% of the dispersion.

U.S. Pat. No. 4,927,876 discloses aqueous polymer dispersions of a water dispersible polyurethane and a vinyl polymer, the polyurethane containing diphenylmethane diisocyanate. The water dispersible polyurethane component is prepared by forming an isocyanate terminated prepolymer having carboxyl functionality incorporated therein, chain extending with an amine. The vinyl polymer may be blended with the water dispersible polyurethane or vinyl monomers may be polymerized in the presence of the aqueous polyurethane dispersion. A variety of monomers suited for polymerization are suggested which include acrylates and hydroxyacrylates.

SUMMARY OF THE INVENTION

The present invention relates to an improved aqueous based, two component coating system based upon crosslinkable hydroxy containing polymers and a polyisocyanate crosslinker. The improvement resides in the utilization of a water-borne hydroxy-terminated prepolymer/acrylic hybrid in combination with a water-dispersible polyisocyanate. Preferably, both components of the hybrid are hydroxy containing, i.e., the hybrid incorporates a hydroxy-terminated polyurethane prepolymer and the acrylic portion also contains hydroxyl functionality. The preferred two component coating composition can be prepared by:

a) forming a carboxy-containing, water-dispersible, isocyanate-terminated polyurethane prepolymer, b) adding at least one acrylic monomer, preferably one which contains a hydroxy-group, to the carboxy-containing, water-dispersible, isocyanate-terminated polyurethane prepolymer to form a prepolymer/monomer mixture, c) adding a tertiary amine to the prepolymer/monomer mixture, d) adding the hydroxy functional acrylic monomer in the presence of another, especially a methacrylic ester, e) dispersing the prepolymer/monomer mixture in water, f) adding an oil-soluble free radical initiator and a hydroxy-containing chain extender to the aqueous dispersion, g) adding a chain terminator, e.g., an alkanolamine to the aqueous dispersion to react with and terminate the length of polyurethane chains;

h) optionally, adding a chain transfer agent to the mixture to limit the molecular weight of the vinyl polymer during polymerization, i) polymerizing the acrylic monomers and completing the chain extension of the prepolymer by heating the aqueous dispersion, and j) mixing the resulting hybrid dispersion with a water-dispersible polyisocyanate.

The aqueous two component, water borne system offers many advantages and these include:

an ability to apply the coating system to metal, plastic, wood, or paper substrates by conventional procedures; and, a mechanism for providing protection to a substrate from solvents, corrodants, and abrasion while at the same time offering a coating having good gloss and flexibility;

an ability to formulate a stable, aqueous coating composition having little to no grit, lumps, etc.;

an ability to formulate an acrylic hybrid having a high concentration of hydroxy functionality for permitting a high crosslink density; and, an ability to formulate an acrylic hybrid in an aqueous medium, thereby eliminating the necessity of utilizing the conventional solvent polymerization followed by separation and neutralization or the polymerization in aqueous medium incorporating surfactants.

DETAILED DESCRIPTION OF THE INVENTION

Water dispersible hydroxy-terminated polyurethane prepolymers can be produced by reacting an organic material containing an average of at least two active hydrogen atoms per molecule, usually a polyether or polyester polyol, with an organic diisocyanate or polyisocyanate. A portion of the organic material also contains, as means for providing water dispersibility to the prepolymer, a compound containing at least one comparatively unreactive pendant carboxylic group which then can be neutralized with an amine. A preferred method is to form an isocyanate terminated polyurethane prepolymer and then react the isocyanate functionality with an alkanolamine.

The polyisocyanates which can be used in making the water dispersible polyurethane prepolymer include aliphatic, cycloaliphatic, araliphatic or aromatic polyisocyanates. Examples of suitable polyisocyanates include, isophorone diisocyanate, cyclohexane-1,4-diisocyanate, 4,4'-dicyclohexylmethane diisocyanate, 3,3-dimethyl-4,4-di(aminocyclohexyl)methane, hexamethylene diisocyanate, dodecamethylene diisocyanate, 1,4-phenylene diisocyanate, 2,4-toluene diisocyanate, 2,6-toluene diisocyanate, 4,4'-diphenylmethane diisocyanate, 2,4-diphenylmethane diisocyanate, xylylene diisocyanate, 1,4-diisocyanatobenzene, polymethylene polyphenyl polyisocyanates and 1,5-naphthalene diisocyanate. Such isocyanates are commonly used in the formulation of polyurethane prepolymers. Mixtures of polyisocyanates also can be used. Isocyanurates, biurets of the above can also be used produce the prepolymers.

Polymeric polyols having molecular weights in the range of 500–6000 are typically used as the organic material containing at least two isocyanate reactive hydrogenators in the preparation of the prepolymer, and include diols and triols and mixtures thereof. Higher functionality polyols generally are used as minor components in a mixture of diols. The polyols may be members of any of the chemical classes of polymeric polyols used or proposed to be used in polyurethane formulations. In particular, the polyols may be polyesters, polyesteramides, polyethers, polythioethers, polycarbonates, polyacetal, polyolefins or polysiloxanes. Preferred polyol molecular weights are from about 100 to 4000.

Polyester polyols which may be used include hydroxy-terminated reaction products of polyhydric alcohols and polycarboxylic acids. Polyhydric alcohols include ethylene glycol, propylene glycol, diethylene glycol, neopentyl glycol, 1,4-butanediol, furan dimethanol, cyclohexane dimethanol, glycerol, trimethylolpropane or pentaerythritol, or mixtures thereof. Polycarboxylic acids, especially dicarboxylic acids or their ester-forming derivatives examples are used for the polyester polyols and include succinic, glutaric and adipic acids or their methyl esters, phthalic anhydride or dimethyl terephthalate. Polyesters obtained by the polymerization of lactones, for example caprolactone, in conjunction with the polyol may also be used. Polyester-amides may be obtained by the inclusion of amino-alcohols such as ethanolamine in the polyesterification mixtures.

Polyether polyols which may be used include products obtained by the polymerization of a cyclic oxide, for example ethylene oxide, propylene oxide or tetrahydrofuran, polycaprolactone or by the addition of one or more such oxides to polyfunctional initiators, for example water, ethylene glycol, propylene glycol, diethylene glycol, cyclohexane dimethanol, glycerol, trimethylol propane, pentaerythritol or Bisphenol A. Especially useful polyethers include polyoxypropylene diols and triols, poly(oxyethylene-oxypropylene) diols and triol obtained by the simultaneous or sequential addition of ethylene and propylene oxides to appropriate initiators and polytetramethylene ether glycols obtained by the polymerization of tetrahydrofuran.

Polythioether polyols which may be used include products obtained by condensing thiodiglycol, either alone or with other glycols, dicarboxylic acids, formaldehyde, amino-alcohols or amino carboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal polyols which may be used include those prepared by reacting glycols such as diethylene glycol, triethylene glycol or hexanediol with formaldehyde. Suitable polyacetals may also be prepared by polymerizing cyclic acetals.

Suitable polyolefin polyols include hydroxy-terminated butadiene homo and copolymers.

Water dispersibility is incorporated into the polyurethane prepolymer through isocyanate-reactive compounds containing acid groups. These compounds are often used in the preparation of the anionic water-dispersible prepolymers which include carboxy group containing diols and triols, represented by the formula:

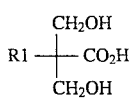

wherein R1 is hydrogen or a $C_1$–$C_{10}$ alkyl group. The preferred carboxy-containing diol is 2,2-dimethylolpropionic acid. If desired, the carboxy-containing diol or triol may be incorporated into a polyester by reaction with a dicarboxylic acid before being incorporated into the prepolymer. Other acid group containing compounds include aminocarboxylic acids, for example lysine, cystine and 3,5-diaminobenzoic acid.

One method for forming the water-dispersible hydroxy-terminated polyurethane prepolymer is by reacting less than a stoichiometric excess of the polyisocyanate with the polymeric polyol and any other required isocyanate-reactive compounds under substantially anhydrous conditions at a temperature between about 30° C. and 130° C. until the reaction between the isocyanate groups and the hydroxyl groups is substantially complete. A polyisocyanate and the active hydrogen containing components are suitably reacted in such proportions that the ratio of the number of isocyanate (NCO) groups to the number of hydroxyl (OH) groups is in the range from about 0.5 to 0.8:1. If desired, tin catalysts may be used to assist prepolymer formation. One problem associated with this method of preparing the hydroxy-terminated polyurethane prepolymer is that crosslinking can occur through the hydroxy/isocyanate groups thus linking several isocyanate terminated prepolymers. As a result, the molecular weight, and therefore the viscosity, tends to become excessive for use in coating formulations. Another problem associated with this technique is that if one desires higher crosslinking density through increased polyfunctionality, viscosity generally becomes too great for processing and effective crosslinking.

A preferred method for producing the hydroxy-terminated urethane prepolymer is through the two step procedure of first forming an isocyanate terminated prepolymer and then converting the isocyanate terminated prepolymer to a hydroxy terminated polyurethane by reacting the isocyanate terminated polyurethane prepolymer with a chain terminator, generally a hydroxy-containing amine, preferably a secondary alkanolamine. Conventional methods of forming the isocyanate terminated polyurethane prepolymer may be used. Typically, the free isocyanate in the prepolymer will be from about 1 to 5%, preferably about 1 to 2%. The polyols utilized in the formation of the polyurethane prepolymer are conventional and will have a molecular weight of from about 1000 to 4000.

Examples of hydroxy amines suited for effecting chain terminating the isocyanateterminated polyurethane prepolymer and converting the isocyanate terminated polyurethane prepolymer to a hydroxy-terminated polyurethane prepolymer include $C_{2-10}$ alkanolamines such as ethanolamine, propanolamine, butanolamine, diethanolamine, di-n-propanolamine, di-n-butanolamine, dicyclohexanolamine, etc. The amine hydrogen is much more reactive with the isocyanate group than is the hydroxy group. As a result, plural hydroxy functionality may be incorporated into the polyurethane prepolymer by utilizing a secondary alkanolamine. And, the advantage of such use is that the molecular weight of the hydroxy-terminated polyurethane prepolymer remains within a low and relatively narrow range, e.g., 1000 to 4000, thereby maintaining low viscosity. Most systems employ chain extension agents, such as primary diamines which result in high molecular weight products, while the use of chain terminators result in the production of low molecular weight.

The polyurethane/acrylate hybrid is prepared by forming a mixture of the carboxy-containing water-dispersible polyurethane prepolymer and acrylic monomer in water and polymerizing. This is accomplished by simply adding an acrylic monomer composition to the prepolymer and polymerizing the acrylic monomer via free radical, emulsion polymerization. In the preferred embodiments, the acrylic monomer composition should contain at least one hydroxy group. Hydroxy containing acrylic monomers include hydroxy acrylates and methacrylates such as hydroxy ethyl acrylate, hydroxyethyl methacrylate, hydroxypropyl acrylate, hydroxypropyl methacrylate, hydroxybutyl acrylate and hydroxybutyl methacrylate.

Suitable ethylenically unsaturated monomers may be polymerized in the presence of the prepolymer along with the hydroxy acrylic-containing comonomer. Suitable classes of monomers include ethylenically unsaturated hydrocarbons, esters, ethers, especially esters of acrylic and methacrylic acids, esters of vinyl alcohol and substituted styrenes. Specific examples of ethylenically unsaturated monomers include styrene, substituted styrenes, the lower alkyl ($C_1$–$C_6$) esters of acrylic, methacrylic and maleic acids, vinyl acetate, vinyl propionate, and butyrate, acrylonitrile, vinyl methyl, propyl, and butyl ethers, vinyl chloride, vinylidene chloride, alkyl esters and ethers, and the like. Suitable polyethylenically unsaturated monomers include butadiene, isoprene, diacrylate esters of $C_2$–$C_6$ diols such as butanediol diacrylate and hexanediol diacrylate, divinyl benzene, divinyl ether, divinyl sulfide, trimethylolpropane triacrylate and the like.

In selecting a comonomer for producing a polyurethane/acrylate hybrid rich in hydroxy functionality, one should incorporate a monomer having slight water solubility, such as, methylmethacrylate. Incorporation of methylmethacrylate tends to compatabilize a hydroxy monomer such as 2-hydroxyethylmethacrylate. Typically, the acrylic portion of the polymer will utilize a hydroxy acrylic monomer in an amount to provide from about 1 to 30%, preferably 10–25% by weight of such monomer in the polymer. The remainder of the polymer typically will comprise at least 20% methylmethacrylate, although levels as high as about 95% may be used.

Prior to dispersing the hydroxy-terminated polyurethane prepolymer/monomer mixture in water, it is customary to add an amine to the mixture in an amount sufficient to render the prepolymer water dispersible, i.e., an amount to substantially neutralize the carboxylic functionality. Suitably, the amine is added at about 65 to 100% amine equivalent per equivalent of carboxy functionality. It is preferred to add the amine until the dihydroxyalkanoic acid is about 80% neutralized. Neutralization of the carboxyl functionality to form a water dispersible polyurethane via addition of an alkali is known and conventional methods may be used.

Amines that may be used in the practice of the invention generally are relatively volatile or they contain hydroxy groups so that they can either evaporate from the coating or be incorporated therein upon curing with the polyisocyanate crosslinker. Examples or amines are represented by the formula:

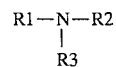

where R1, R2 and R3 are independently $C_1$–$C_4$ alkyl and hydroxyalkyl groups. Illustrative of such tertiary amines are triethylamine, dimethylethanolamine, methyldiethanolamine, and methyldiethylamine, triethanolamine, etc.

The polyurethane prepolymer/acrylic monomer mixture may be dispersed in water using techniques well known in the art. Preferably, the polyurethane/acrylic mixture is added to the water with agitation, or, alternatively, water may be stirred into the mixture. It is important that the tertiary amine be added in water to the prepolymer/monomer mixture before the mixture is dispersed in water to ensure compatibility of the organic and aqueous phases in the resulting dispersion. It is also preferable to add the hydroxy acrylate to the polyurethane/acrylate mixture after neutralization of the carboxyl functionality and after the addition of the comonomers. To also enhance the compatibility of the organic and aqueous phases, a small quantity of a polar organic liquid, such as N-methyl-pyrrolidone, can be added in amounts ranging from 0 to 12 wt %, preferably 3-6 wt %, of the final polymer dispersion.

A chain transfer agent often is added to the aqueous dispersion. Suitable chain transfer agents would include mercaptans. The amount of mercaptan compound employed is from 0.5 to 10 wt % based on the total monomer amount used in the formation of the hybrid. The addition of the chain transfer agent results in a lower molecular weight acrylic polymer which in turn results in this coating composition having higher gloss.

Polymerization of the ethylenically unsaturated monomers in the prepolymer/vinyl monomer mixture is effecting via free radical polymerization. In order to improve the water resistance of the cured product, the free radical initiator used should be an oil soluble initiator. By that it is meant that the material is a free radical generating material that preferentially portions into the organic phase compared to the aqueous phase. Suitable oil soluble free radical initiators include the azo-type initiators such as 2,2'-azobis(2,4-di-methylpentanenitrile), 2,2'-azobis(2-methylbutyronitrile) and 2,2'-azobis(2methylpropanin) [AIBN]. Of course, other initiators could be used such as hydrogen peroxide but water soluble initiators suffer from the disadvantage that they may reduce water resistance of the resulting polymer. Redox systems comprising reducing agents and oxidizing agents (free radical initiators) as are well known in the polymerization art can also be used, but the free radical initiator preferably should be oil soluble.

The free radical polymerization of the monomer mixture is conducted at an elevated temperature, namely a temperature sufficient to liberate free radicals at a rate that sustains the polymerization reaction. A suitable temperature range would be 50° C. to 90° C., preferably 60° C. to 80° C.

The proportion of monomers used, based on total solids in the resulting dispersion, is suitably from 25 to 75%, preferably from 40 to 60%. The molecular weight and chain length of the vinyl polymers can be controlled by the amount of chain transfer agent and initiator added. The amount of initiator sufficient for this process is from 0.05 to 10 wt % based on monomer amount. Optimum results are obtained when the hybrid dispersion OH equivalents and the water-dispersible polyisocyanate are used in a ratio of 1:3 to 1:1 and when the urethane and acrylic portions of the hybrid dispersions are composed of oligomers with molecular weights between 2,000 and 10,000. Broadly, the molecular weight range will be from about 1000 to 150,000, but as noted the preferred product will have a weight of from 2000 to 10,000.

The second component of the coating formulation is a water dispersible polyisocyanate and its function is to react with the hydroxyl groups on the hydroxy-terminated polyurethane and, if present, the hydroxy groups contained in the acrylate portion. It is incorporated in amount sufficient (generally in excess of stoichiometric) to effect crosslinking. Water dispersible polyisocyanates are known. Typically, they are derivatives of isocyanates of the type described previously. Usually, some hydrophilicity is incorporated into the polyisocyanate to enhance dispersibility although that is not absolutely necessary. They also may be derivatives of biurets, isocyanurates, and uretidiones. Examples of water dispersible isocyanates are noted in U.S. Pat. No. 5,331,039 and are incorporated by reference.

The coating compositions typically comprise from 20 to 60 wt % solids and may be employed as coating compositions and applied to a substrate including wood, metals, glass, cloth, leather, paper, plastics, foam and the like by any conventional method including brushing, dipping, flow coating, spraying and the like. Generally, the aqueous coating composition is dried and cured at temperature ranging from ambient to 150° C. for times ranging from 5 to 120 minutes.

Other ingredients commonly used in coating formulations, such as organo-tin catalysts, surfactants, light stabilizers, etc., can be added to the formulation to tailor properties as desired. In addition, other pigments and pigment dispersions can be used to obtain modify optical properties, mechanical strength, and corrosion inhibition. These compositional modifications are well known in the art of coating formulation.

One of the advantages of the coating compositions of this invention is in the ability to achieve high crosslink density through the hydroxyl groups pendant form the polyurethane and present in the acrylic portion of the hybrid. Conventional emulsion polymerization of a hydroxy-containing monomer having high water solubility, in combination with other acrylic monomers, to form the polyurethane/acrylic hybrid is difficult. Typically, there is an upper limit in the amount of hydroxyacrylate which can be incorporated into the latex, e.g., (3–5% of the monomer by weight). It is believed this synthetic difficulty is mainly caused by the formation of a water soluble polymer from the water soluble monomer. The water soluble polymer then may bridge the latex particles which are formed during the polymerization to form grit and lumps. In the worst case, excess hydroxy-containing monomer may cause latex flocculation of the emulsion. However, for effective latex crosslinking suited for the preparation of solvent and water resistant coatings, a higher percentage (>10 wt %) of hydroxy-containing comonomer is needed in the composition. The compositions here can be synthesized to provide a high (10–30%) hydroxy containing comonomer content. The synthetic difficulty is eliminated in the polymerization process employed, e.g., through the use of the hydroxy-terminated polyurethane prepolymer, the use of an oil soluble initiator, another comonomer that is very compatible with the hydroxy-containing monomer and delayed addition of the hydroxy-acrylate. The use of oil soluble initiator renders most of the polymerization initiated in the oil phase. The presence of a compatible comonomer increases the solubility of the hydroxy-containing monomer in the oil phase and decreases the solubility of polymer formed from hydroxy-containing monomer and comonomer in the aqueous phase. As a result, the resulting latex is free of grit and lumps and essentially no water soluble acrylic material is detected in the aqueous phase.

A second advantage achievable with the coating compositions described herein is the ability too effect crosslinking at ambient temperature. For ambient crosslinking chain mobility at low temperature is also required. We believed that the high viscosity of the latex particle severely limited the inter particle material flow and therefore crosslinking of conventional systems was difficult at low temperature. The compatibility between the urethane and acrylic in conventional hybrids was established through the interchain entanglement and very high molecular weight. The preferred polyurethane hybrids described herein have a molecular weight which is relatively low. In contrast to prior systems, the molecular weight of the polymer within the hybrid latex is tailored by primarily by the chain termination agent for the urethane part and chain transfer agent for the acrylic part. The compatibility between the urethane and acrylic is achieved through interchain hydrogen bonding instead of chain entangling for conventional hybrid.

A customary disadvantage of two-component ambient curable waterborne systems is that the final coating usually shows relatively lower gloss than the solvent based system. This is due to the inherent difference in the film formation process between the waterborne system and solvent borne system. The film formation of two component water borne system involves the latex coalescence and inter particle diffusion. The high viscosity within the latex particles usually limits the extent of material flow, results in poor particle diffusion, forms an unsmooth surface and leads to lower gloss. The current coating compositions employing the hydroxy-terminated polyurethane and, preferably, in combination with a hydroxy acrylate to form a hybrid overcomes those limitations in film formation and provide the final film with excellent gloss after crosslinked by water reducible polyisocyanates.

EXAMPLE 1

Preparation of Water Based, Low Molecular Weight Hydroxy Terminated Polyurethane/Hydroxy Acrylate Hybrid Polymer This example illustrates the process of preparation of a water-based urethaneacrylic hybrid containing hydroxy functionality using the ingredients listed in Table 1.

TABLE 1

| Raw Materials | Parts by Weight |
| --- | --- |
| 1. Formrez 55–56[a] | 200.15 |
| 2. Methylene Dicyclohexyl Diisocyanate | 105.43 |
| 3. 10% DABCO T-12[b] | 0.48 |
| 4 Dimethylolpropionic Acid | 26.82 |
| 5. N-Methylpyrrolidinone | 110.08 |
| 6. Butyl Acrylate | 199.79 |
| 7. Triethylamine | 19.74 |
| 8. Methyl Methacrylate | 64.67 |
| 9. 2-Hydroxyethylmethacrylate (HEMA) | 64.64 |
| 10. Deionized Water | 800.00 |
| 11. Vazo-64[c] | 2.95 |
| 12. N-Methylpyrrolidinone | 13.87 |
| 13. Diethanolamine | 22.65 |
| 14. Deionized Water | 32.68 |
| 15. 1-Dodecylthiol | 20.20 |

[a]Poly(neopentyl adipate) MW~2000 from Witco Chemical.
[b]Dibutyltin dilaurate from Air Products and Chemicals, Inc.
[c]Vazo-64 is a trademark used to identify 2,2'-azobis(2-methylpropanenitrile), sometimes referred to as 2,2-azobis(isobutyronitrile).

The water-based polyurethane/acrylic hybrid polymer was formulated as follows: Polyol (1) was charged into a nitrogen purged 1-L reactor. To this was added diisocyanate (2) and tin catalyst (3). This mixture was stirred at 92° C. for 3 hours. With constant stirring, acid diol (4) was added, followed by the addition of 1-methyl-2-pyrrolidinone (5).

The mixture was held at 92° C. for an additional 5 hours. The prepolymer was cooled to 75° C. and acrylic monomer (6) was added. The mixture was stirred for 15 minutes before a sample was removed to determine the free % NCO. At a free NCO content of about 1 to 1.5%, the mixture was cooled to 25° C. and triethylamine (7) was added and allowed to react for 1 hour. Following neutralization, acrylic monomers (8 and 9) were added and stirred for 5 minutes. The addition of methylmethacrylate and hydroxyethylmethacrylate together enhances latex stability. The prepolymer was then dispersed into deionized water (10). To chain terminate, diethanolamine (13) was dissolved in deionized water (14), added to the reactor, and allowed to react for 2 hours. A free radical initiator (11) dissolved in 1-methyl-2-pyrrolidinone (12) and the thiol chain transfer agent (15) was added. After 5 minutes, the dispersion was heated to 75° C. and held there for 2 hours. The molecular weight of the hybrid was estimated to be about 4000.

EXAMPLE 2

Preparation of Water Based Hydroxy Terminated Polyurethane/HydroxyAcrylate Hybrid Polymer The procedure of Example 1 was utilized except that a different grade of oil soluble free radical initiator (2,2'-azobis(2-methylbutyronitrile) was substituted for the Vazo 64 initiator, i.e. Vazo 67. The concern was in the type of product that could be achieved with a less toxic initiator. All other parameters remained the same.

EXAMPLE 3

Preparation of Water Based Hydroxy Terminated Polyurethane/HydroxyAcrylate Hybrid Polymer The procedure of Example 1 was repeated except that 133.4 g butyl acrylate, 126.7 g of methyl methacrylate, and 63.3 g of 2-hydroxyethylmethacrylate were used as the monomers. The methylmethacrylate and reduced butyl acrylate was increased in an attempt to increase hardness. All other parameters were the same.

EXAMPLE 4

Preparation of Water Based Hydroxy Terminated Polyurethane/HydroxyAcrylate Hybrid Polymer The procedure of Example 1 was repeated except that 199.4 g of butyl methacrylate, 63.3 g of methyl methacrylate, and 63.9 g of 2-hydroxyethylmethacrylate were used as the acrylic monomers. All other parameters were the same.

EXAMPLE 5

Preparation of Water Based Hydroxy Terminated Polyurethane/HydroxyAcrylate Hybrid Polymer The procedure of Example 1 was repeated except that 133.3 g of butyl methacrylate, 127.0 g of methyl methacrylate, and 63.7 g of 2-hydroxyethylmethacrylate were used as the acrylic monomers. All other parameters were the same.

EXAMPLE 6

Preparation of Water Based Hydroxy Terminated Polyurethane/HydroxyAcrylate Hybrid Polymer The procedure of Example 1 was repeated except that 199.74 g butyl acrylate, 63.7 g of methyl methacrylate, and 63.8 g of 2-hydroxyethylacrylate were used as the acrylic monomers. All other parameters were the same.

EXAMPLE 7

Preparation of Water Based Hydroxy Terminated Polyurethane/HydroxyAcrylate Hybrid Polymer The procedure of Example 1 was repeated except that the level of Vazo 67 (2,2'-azobis(2-methylbutyronitrile) initiator was increased by 15%.

EXAMPLE 8

Coating Formulation and Casting

The water-borne urethane hybrids of the previous examples were evaluated for conventional applications as follows using the following formulation:

| | Parts by weight |
|---|---|
| 1. Example 1 hydroxyurethane/hydroxy acrylate hybrid | 30 g |
| 2. XP-7063 (Miles) | 8.16 g |
| 3. Propylene glycol methyl ether acetate (PMA) | 8.16 g |
| 4. BYK-345 (BYK-Chemie) | 0.12 g |

XP-7063 is a commercial water dispersible polyisocyanate is a solvent free, water-dispersible polyisocyanate based on hexamethylene diisocyanate.
BYK-345 is commercial flow promoting additive is a trademark used to identify polyether modified dimethylpolysiloxanes.

All four materials were added together and stirred for 15 minutes. The mixture was then allowed to sit for 5 minutes, after which a clear film was cast. After an induction time of an additional 60 minutes, another clear film was cast. The coating composition, which was applied in a wet film thickness of 300 μm (which corresponds to a dry film thickness of approximately 50 μm), immediately appeared clear and transparent at room temperature. Final curing was achieved after 7–10 days at ambient laboratory condition. The properties for the cured coating are listed in Example 11, Table 2.

EXAMPLE 9

Coating Formulation and Casting

The water borne urethane hybrids of previous examples were evaluated for conventional applications as follows using the following formulation:

| | Parts by weight |
|---|---|
| 1. Example 1 hydroxyurethane/hydroxy acrylate hybrid | 30 g |
| 2. XP-7063 (Miles) | 8.16 g |
| 3. FC-171 (3M) | 0.23 g |

FC-171 is a commercial flow additive a nonionic fluorinated alkyl alkoxylated surfactant.

All three materials were added together and stirred for 15 minutes. The mixture was then allowed to sit for 5 minutes, after which a clear film was cast. After an induction time of an additional 60 minutes, another clear film was cast. The coating composition, which was applied in a wet film thickness of 300 μm (which corresponds to a dry film thickness of approximately 50 μm), immediately appeared clear and transparent at room temperature. Final curing was achieved after 7–10 days. The properties for the cured coating are listed in Example 11, Table 2.

EXAMPLE 10

Coating Formulation and Casting

In this example a formulation was prepared and formulated into a coating as was done in Example 9.

| | Parts by weight |
|---|---|
| 1. Example 1 urethane/hydroxy hybrid | 30 g |
| 2. XP-7063 (Miles) | 8.16 g |
| 3. Propylene glycol methyl ether acetate (PMA) | 8.16 g |
| 4. FC-171 (3M) | 0.28 g |

All four materials were added together and stirred for 15 minutes. The mixture was then allowed to sit for 5 minutes, after which a clear film was cast. After an induction time of an additional 60 minutes, another clear film was cast. An induction time of 5 minutes total was preferred. The coating composition, which was applied in a wet film thickness of 300 μm (which corresponds to a dry film thickness of approximately 50 μm), immediately appeared clear and transparent at room temperature. Final curing was achieved after 7–10 days. The properties for the cured coating are listed in Example 11, Table 2.

EXAMPLE 11

Coating Formulation and Casting

The formulated aqueous hybrid dispersions Examples 8–10 were evaluated as coating compositions on cold rolled steel panels. Table 2 presents the data for the evaluation of the various coatings.

TABLE 2

| | Example 8 | Example 9 | Example 10 |
|---|---|---|---|
| Gloss 60° | 93.4 | 92.3 | 90.6 |
| Solvent Resistance | Excellent | Excellent | Excellent |
| Dry Tape Adhesion[a] | 5A | 5A | 5A |
| Dry Scrape[b] | 3 kg | 3 kg | 2 kg |
| 22° C., 24 hr. Water Immersion | Excellent | Excellent | Excellent |
| Reverse Impact[c] | 160 | 152 | 160 |

[a]ASTM D3359
[b]ASTM D2197
[c]ASTM D2794

The coatings listed in Table 2 exhibit excellent properties for clear films. Gloss is in excess of 90 at 60°. In addition the coatings have excellent solvent resistance and the reverse impact tests show that the coatings have excellent flexibility.

EXAMPLE 12

Pigmented Coating Formulation and Casting

The aqueous hybrid dispersions Examples 1–7 were formulated to obtain pigmented coatings. The ingredients of one such formulated product are listed in Table 3.

TABLE 3

| Raw Materials | Parts by Weight |
| --- | --- |
| Example 1 urethane/hydroxy hybrid | 100.0 |
| BYK-345 (BYK-Chemie) | 0.4 |
| Titanium dioxide dispersion, CW-5003 (Daniel Products) | 68.5 |
| Propylene glycol methyl ether acetate | 16.0 |
| XP-7063 (Miles) | 27.0 |

The formulated aqueous hybrid dispersion listed in Table 3 was applied and evaluated as a coating on cold rolled steel panels. Table 4 presents the properties of this coating.

TABLE 4

| | |
| --- | --- |
| 20° gloss (ASTM D523) | >60 |
| 60° gloss (ASTM D523) | >85 |
| Adhesion | |
| Dry tape (ASTM D3359) | 5A |
| Wet tape (24 hr @ 70° F.) | 5A |
| Scrape (ASTM D2197) | >6 kg |
| Chemical Resistance | |
| MEK (ASTM D4752) | >200 double rubs |
| Toluene | >200 double rubs |
| IPA | >200 double rubs |
| Engine oil (24 hr @ 250° F.) | No effect |
| Hydraulic fluid (24 hr @ 150° F.) | No effect |
| Acid, 5% $H_2SO_4$, pH - 0.6 | No effect |
| Base, 5% NaOH, pH - 13.5 | No effect |
| Impact resistance (ASTM D2794) | >160 in. lb. |
| Mandrel bend (ASTM D1737) | 0.125 inch |
| Pencil hardness (ASTM D3363) | HB |
| Pendulum hardness (ASTM D 4366) 90 cycles | |

The results show that the chemical resistance of the resulting coating was excellent by virtue of the fact that the double rub resistance exceeded 200 for several solvents.

EXAMPLE 13

Preparation of Water Based, High Molecular Weight Hydroxy Terminated Polyurethane/HydroxyAcrylate Hybrid Polymer This example is intended to show the influence of molecular weight on the performance of the polyurethane/acrylate hybrid. The procedure of Example 1 was repeated except that the chain transfer agent was eliminated. Table 5 sets forth the recipe.

TABLE 5

| High Molecular Weight version of Table 1: | |
| --- | --- |
| Materials | Parts by Weight |
| 1. Formrez 55-56 | 100.30 |
| 2. Methylene Dicyclohexyl Diisocyanate | 91.10 |
| 3. 10% Dabco T-12 | 0.29 |
| 4. Dimethylolpropionic Acid | 14.80 |
| 5. N-Methylpyrrolidinone | 54.70 |
| 6. Butyl Acrylate | 124.00 |
| 7. 1,6-Hexanedioldiacrylate | 0.89 |

TABLE 5-continued

| High Molecular Weight version of Table 1: | |
| --- | --- |
| Materials | Parts by Weight |
| 8. Triethylamine | 10.60 |
| 9. Methyl Methacrylate | 48.80 |
| 10. 2-Hydroxyethyl Methacrylate | 30.20 |
| 11. Deionized Water | 501.50 |
| 12. Vazo-52 | 0.92 |
| 13. N-Methylpyrrolidinone | 8.20 |
| 14. Ethylenediamine | 9.30 |
| 15. Deionized Water | 19.60 |

*Vazo-52 used for safety reasons

The molecular weight was estimated to be about 150,000. When the coating composition was cast as a film, visual inspection indicated that the gloss was much poorer than the film of Example 1. Appearance was relatively poor.

EXAMPLE 14

High Molecular Weight Hydroxy-Terminated Polyurethane Prepolymer/Non Acrylate Hybrid Example 14 illustrates the using of a hydroxy-terminated urethane prepolymer as was used in Example 1 but the hybrid formed from a non-hydroxy-acrylic monomer. In other words, the hydroxy groups were present only in the urethane portion and not in the acrylic portion. The ingredients are listed in Table 6.

TABLE 6

| Raw Materials | Parts by Weight |
| --- | --- |
| 1. Formrez 55–56[a] | 100.00 |
| 2. Methylene Dicyclohexyl Diisocyanate | 90.60 |
| 3. 10% DABCO T-12[b] | 0.25 |
| 4 Dimethylolpropionic Acid | 14.80 |
| 5. N-Methylpyrrolidinone | 54.60 |
| 6. Butyl Methacrylate | 206.16 |
| 7. 1,6-Hexanedioldiacrylate | 0.90 |
| 8. Triethylamine | 10.86 |
| 9. Deionized Water | 552.88 |
| 10. Vazo-64[c] | 0.90 |
| 11. N-Methylpyrrolidinone | 8.33 |
| 12. [(aminoethyl)amino]ethanol | 16.62 |
| 13. Deionized Water | 20.02 |

[a]Poly(neopentyl adipate) MW~2000 from Witco Chemical.
[b]Dibutyltin dilaurate from Air Products and Chemicals, Inc.
[c]AIBN from DuPont.

The polyol (1) was charged into a nitrogen purged 1-L reactor. To this was added a diisocyanate (2) and a tin catalyst (3). This mixture was allowed to stir at 92° C. for 3 hours. With constant stirring, the acid diol (4) was added, followed by 1-methyl-2-pyrrolidinone (5). The mixture was held at 92° C. for an additional 5 hours.

The prepolymer was cooled to 75° C. and the acrylic monomers (6) & (7) were added. The mixture was stirred for 15 minutes before a sample was removed to determine the free % NCO. Next, the mixture was cooled to 25° C. and triethylamine (8) was added and allowed to react for 1 hour. Following the neutralization, the prepolymer/monomer mixture was then dispersed into deionized water (9). To chain extend, 2,2-[(aminoethyl)amino]ethanol (12) was dissolved in deionized water (13), added to the reactor, and allowed to react for 2 hours. A free radical initiator (10) dissolved in 1-methyl-2-pyrrolidinone (11) was then added. After 5 minutes, the dispersion was heated to 75° C. and held there for 2 hours. After the polymerization was completed, the dispersion was cooled to room temperature and was filtered through a filter. The polyurethane/acrylate hybrid was estimated to have a molecular weight of from 100,000 to 150,000.

The dispersion was evaluated based on the following formulation:

| Dispersion Example 1-1 | 30 |
|---|---|
| Surfynol 465 is a trademark for ethoxylated tetramethyldecynediol. | 0.18 |
| OT-75 is a trademark used to identify diocytyl ester of sodium sulfosuccinic acid. | 0.18 |
| Foamaster VF is a trademark used to identify a proprietary commercial defoamer. (Henkel) XP 7063 | 0.12 |

The coatings gave good chemical and solvent resistance. However, the gloss was poor and hazy in comparison to Examples 8, 9, and 10. It was believed gloss was reduced by the presence of large molecular weight segments in the polymer. The presence of large segments was due to the lack of a chain transfer agent in the polymerization mixture. Excellent crosslinking was observed through the use of the hydroxy-terminated polyurethane prepolymer.

EXAMPLE 15

Preparation of Water Based, High Hardness Hydroxy Terminated Polyurethane/HydroxyAcrylate Hybrid Polymer The procedure of Example 1 was repeated except that the level of methyl methacrylate was increased in an effort to increase the hardness of the resulting coating. Table 6 sets forth the results and Table 7 provides a comparison between the formulation of Example 1 and this Example 15.

TABLE 6

| Material | Amount |
|---|---|
| 1. Formrez 55–56 | 200.10 |
| 2. Methylene Dicyclohexyl Diisocyanate | 105.30 |
| 3. 10% Dabco T-12 | 0.52 |
| 4. Dimethylolpropionic Acid | 26.80 |
| 5. N-Methylpyrrolidinone | 110.00 |
| 6. Methyl Methacrylate | 199.70 |
| 7. Triethylamine | 19.50 |
| 8. Methyl Methacrylate | 64.20 |
| 9. 2-Hydroxyethyl Methacrylate | 64.20 |
| 10. Deionized Water | 800.20 |
| 11. Vazo-67 | 3.94 |
| 12. N-Methylpyrrolidinone | 13.52 |
| 13. Diethanolamine | 18.60 |
| 14. Deionized Water | 32.50 |
| 15. 1-Dodecylthiol | 20.20 |

TABLE 7

| | Example 1 | Example 15 |
|---|---|---|
| 20° Gloss (ASTM D523) | 61.9 | 66.8 |
| 60° Gloss (ASTM D523) | 89.7 | 93.5 |
| 85° Gloss (ASTM D523) | 94.7 | 96.9 |
| Solvent Resistance MEK, Toluene, IPA | >200 double rubs | >200 double rubs |
| Pendulum Hardness | 56 | 111 |
| Dry Scrape Adhesion (ASTM D2197) | 6 kg | 9 kg |
| Impact Resistance (ASTM D2794) | 160 in. lb. | 120 in. lb. |

TABLE 7-continued

| | Example 1 | Example 15 |
|---|---|---|
| Pencil Hardness (ASTM D3363) | 5B | 2B |
| Dry Tape Adhesion (ASTM D3359) | 4A | 5A |

The results show that the hardness of the coating was increase due to the formulation change.

COMPARATIVE EXAMPLE 1—1

Conventional High Molecular Weight Chain Extended Isocyanate-Terminated Polyurethane Prepolymer/Hydroxy Acrylate Hybrid Example 1—1 illustrates the using of a water-based urethane-acrylic hybrid dispersion wherein the polyurethane prepolymer is a conventional, high molecular weight, chain extended isocyanate terminated polyurethane prepolymer and only the acrylic portion has pendant hydroxy groups. The ingredients are listed in Table 8 and the example is comparable to Examples 1 and 13

TABLE 8

| Raw Materials | Parts by Weight |
|---|---|
| 1. Formrez 55–56[a] | 100.00 |
| 2. Methylene Dicyclohexyl Diisocyanate | 90.60 |
| 3. 10% DABCO T-12[b] | 0.25 |
| 4 Dimethylolpropionic Acid | 14.80 |
| 5. N-Methylpyrrolidinone | 54.60 |
| 6. Butyl Methacrylate | 141.60 |
| 7. 1,6-Hexanedioldiacrylate | 0.88 |
| 8. Triethylamine | 10.66 |
| 9. Deionized Water | 489.97 |
| 10. Vazo-64[c] | 0.88 |
| 11. N-Methylpyrrolidinone | 6.93 |
| 12. Ethylenediamine | 8.97 |
| 13. Deionized Water | 16.67 |
| 14. Butylmethacrylate (BMA) | 31.44 |
| 15. 2-Hydroxyethylmethacrylate (HEMA) | 29.12 |

[a]Poly(neopentyl adipate) MW~2000 from Witco Chemical.
[b]Dibutyltin dilaurate from Air Products and Chemicals, Inc.
[c]AIBN from DuPont.

The polyol (1) was charged into a nitrogen purged 1-L reactor. To this was added a diisocyanate (2) and a tin catalyst (3). This mixture was allowed to stir at 92° C. for 3 hours. With constant stirring, the acid diol (4) was added, followed by 1-methyl-2-pyrrolidinone (5). The mixture was held at 92° C. for an additional 5 hours.

The prepolymer was cooled to 75° C. and the acrylic monomers (6) & (7) were added. The mixture was stirred for 15 minutes before a sample was removed to determine the free % NCO. The reaction was terminated at about percent free NCO. Next, the mixture was cooled to 25° C. and triethylamine (8) was added and allowed to react for 1 hour. Following the neutralization, the prepolymer/monomer mixture was then dispersed into deionized water (9). To chain extend, ethylenediamine (12) was dissolved in deionized water (13), added to the reactor, and allowed to react for 2 hours. A free radical initiator (10) dissolved in 1-methyl-2-pyrrolidinone (11) was then added and a mixture of butyl methacrylate (14) and HEMA (15) was also added. After 5 minutes, the dispersion was heated to 75° C. and held there for 2 hours.

After completion of the polymerization, the dispersion was filtered through a filter. Large chunks (>8%) of white solid remained in the filter. The dispersion also appeared to have much higher viscosity. As noted from other work, there is extreme difficulty in preparing a polyurethane/acrylate hybrid where the acrylic portion has hydroxyl functionality, particularly at high levels of hydroxy acrylate monomer in the resulting acrylate polymer.

A modified process that employed a slow addition of HEMA/BMA (or using 4-hydroxybutyl acrylate) gave the same amount of chunks after the polymerization.

The sample of Example 1—1 was mixed with the water reducible polyisocyanate XP-7043 in the following manners:

|  | parts by weight |
|---|---|
| Dispersion Example 1-1 | 100 |
| XP-7043 | up to 2.5 |

After mixing, application, and cure of coatings with XP-7043 concentrations of 0.5, 1.1 and 2.5 parts by weight with 100 parts of dispersion Example 1—1, all three coatings had poor solvent resistance. This was mainly evident by poor results with, isopropanol rub resistance.

The dispersion was reformulated and the test repeated at a 5% addition of XP-7043. The formulation is listed in Table 9 was utilized.

TABLE 9

|  | Parts By Weight |
|---|---|
| Dispersion Example 1-1 | 100 |
| Surfynol 465 | 0.3 |
| OT-75 | 0.3 |
| Foamaster VF (Henkel) | 0.4 |
| Tinuvin 292 (Ciba Geigy) is a trademark used to identify a sterically hindered tertiary light stabilizer, viz., bis(1,2,2,6,6-pentamethyl-4-piperidinyl)sebacate. | 1.5 |
| Tinuvin 384 is a trademark used to identify a substituted benzotriazole in xylene. (Ciba Geigy) | 1.0 |
| XP-7043 | 5 |

This first formulation had marginal solvent resistance (MEK, toluene, IPA), poor acid and alkali resistance (5% NaCl & 5% $H_2SO_4$), and poor resistance to hot engine oil. Again, with the second formulation of Table 9, there was marginal solvent resistance.

The results of the tests in Examples 1–13 and 1—1 show that excellent gloss is obtained when the hybrid dispersion is made up of low molecular weight oligomers which are the result of utilizing both a chain terminated, hydroxy-terminated polyurethane prepolymer and an acrylic portion having hydroxyl functionality, with the degree of polymerization reduced through the use of a chain transfer agent. Also there is excellent solvent resistance for these systems is obtained for the two component systems and when the crosslinking results from the reaction of the hydroxyl functionality present on both the hydroxy-terminated urethane and the acrylic portion of the hybrid. Solvent resistance is also good when the polyurethane component has hydroxy termination.

What is claimed is:

1. In a two component coating system based upon crosslinkable hydroxy containing polymers and a polyisocyanate crosslinker, the improvement which resides in (a) the utilization of a water-borne polyurethane prepolymer/hybrid containing polymerized acrylate units, wherein the polyurethane prepolymer component of said polyurethane prepolymer/hybrid is terminated by reaction with a $C_{2-10}$ alkanolamine and (b) a water-dispersible polyisocyanate as said polyisocyanate crosslinker.

2. The coating composition of claim 1 wherein the water dispersible polyisocyanate is an aliphatic, aromatic or cycloaliphatic diisocyanate.

3. The coating composition of claim 2 wherein the polyisocyanate employed in forming said polyurethane prepolymer component of said prepolymer/hybrid containing polymerized acrylate units is an aliphatic, aromatic or cycloaliphatic diisocyanate.

4. The coating composition of claim 3 wherein the polyurethane prepolymer/hybrid containing polymerized acrylate units contains polymerized hydroxy acrylate units as a component of said polyurethane prepolymer/hybrid.

5. The coating composition of claim 4 wherein the polymerized hydroxy acrylate units in said polyurethane prepolymer/hybrid comprises polymerized units of a hydroxy acrylate of a $C_{1-6}$ alkyl ester of acrylic or methacrylic acid and the polymerized acrylate units comprise at least one $C_{1-6}$ alkyl ester of acrylic or methacrylic acid.

6. The coating composition of claim 5 wherein the polyisocyanate in said polyurethane prepolymer/hybrid containing polymerized acrylate units is selected from the group consisting of isophorone diisocyanate, cyclohexane-1,4-diisocyanate, 4,4'-dicyclohexylmethane diisocyanate, 3,3-dimethyl-4,4-di(aminocyclohexyl)methane, hexamethylene diisocyanate, and dodecamethylene diisocyanate.

7. The coating composition of claim 6 wherein the $C_{2-10}$ alkanolamine is a secondary alkanolamine.

8. The coating composition of claim 7 wherein the secondary alkanolamine is diethanolamine.

9. The coating composition of claim 6 wherein the acrylate portion of the polyurethane prepolymer/hybrid containing polymerized acrylate units comprises from about 10 to 25% by weight of a hydroxyacrylate and at least 20% by weight of methylmethacrylate.

10. In a process for forming a two component coating composition can be prepared by
   a) forming a carboxy-containing, water-dispersible, isocyanate-terminated polyurethane prepolymer,
   b) adding at least one acrylic monomer to the carboxy-containing, water-dispersible, isocyanate-terminated polyurethane prepolymer,
   c) adding a tertiary amine to the isocyanate-terminated polyurethane prepolymer/monomer mixture, to effect neutralization of the carboxy group,
   d) dispersing the prepolymer/monomer mixture in water,
   e) adding an oil-soluble free radical initiator,
   (f) polymerizing the acrylic monomer, and
   g) mixing the resulting hybrid dispersion with a water-dispersible polyisocyanate, the improvement which comprises:
      reacting said the isocyanate-terminated polyurethane prepolymer with a $C_{2-10}$ alkanolamine to form a chain terminated polyurethane prepolymer and utilizing said water dispersible chain terminated polyurethane prepolymer as at least a partial replacement for said water dispersible, isocyanate polyurethane prepolymer and a hydroxyacrylate as one of the monomer components in the formation of the prepolymer/monomer mixture.

11. The process of claim 10 wherein at least one hydroxyacrylate is added to the resulting neutralized chain terminated polyurethane prepolymer prior to polymerization.

* * * * *